United States Patent [19]

Treff

[11] Patent Number: 4,971,339
[45] Date of Patent: Nov. 20, 1990

[54] COLLET TYPE WORK DRIVER

[75] Inventor: Conrad C. Treff, Madison Heights, Mich.

[73] Assignee: Illinois Tool Works, Inc., Chicago, Ill.

[21] Appl. No.: 208,069

[22] Filed: Jun. 17, 1988

[51] Int. Cl.⁵ .............................................. B23B 31/30
[52] U.S. Cl. .......................................... 279/4; 279/50;
  279/51; 82/155; 82/165
[58] Field of Search .................... 279/1 L, 4, 50, 51;
  82/165, 166, 167, 168, 169, 155

[56] References Cited

U.S. PATENT DOCUMENTS

| | | | |
|---|---|---|---|
| 1,812,006 | 6/1931 | Jellicoe | 279/1 L |
| 2,042,648 | 6/1936 | Ziegler . | |
| 2,693,631 | 11/1954 | Redman | 82/165 |
| 3,072,416 | 1/1963 | Leifer | 279/4 |
| 3,344,695 | 10/1967 | Hohwart . | |
| 3,880,046 | 4/1975 | Sessody | 279/50 |
| 4,094,521 | 6/1978 | Piotrowski | 279/4 |
| 4,215,605 | 4/1980 | Toth | 82/165 |
| 4,509,765 | 4/1985 | Nowak . | |
| 4,540,187 | 9/1985 | Morawski | 279/1 C |
| 4,615,101 | 10/1986 | Edwards . | |

Primary Examiner—Frederick R. Schmidt
Assistant Examiner—Blynn Shideler
Attorney, Agent, or Firm—Schwartz & Weinrieb

[57] ABSTRACT

A collet type work driver for holding and driving a workpiece which is located between work centers upon a grinder, lathe or similar machinery, is disclosed. The work driver includes a unique free-floating collet package which rotates essentially free from contact with the remaining components of the work driver. Radial positioning forces are thus eliminated and existing workpiece eccentricities are automatically accommodated. The work driver can be rapidly loaded and unloaded and can have a significant effect upon production rates. The collet package portion is loosely retained within the work driver during idle periods and will not be lost or damaged. Uniform gripping action by means of the work driver eliminates workpiece deflection and surface marking and enables the device to be used with very fragile and brittle workpieces.

20 Claims, 3 Drawing Sheets 4,971,339

COLLET TYPE WORK DRIVER

FIELD OF THE INVENTION

This invention relates to a work driver for gripping and rotating a workpiece located between centers of a grinding machine, lathe, or similar equipment. More specifically, the invention relates to an improved, collet-type work driver which is automatic in operation.

BACKGROUND OF THE INVENTION

It is common practice in certain grinding operations to secure a workpiece located between centers of a grinding machine, lathe or the like, by attaching a driving dog to one end of the workpiece and tightening a set screw which extends through the driving dog and into contact with the workpiece itself. Once the driving dog is secured, a protruding portion thereof is then rotationally driven by means of a drive pin connected to a machine spindle. As a result, the workpiece revolves about a longitudinal axis defined by means of the centers supporting it, thereby allowing grinding operations or the like to be performed.

Loading and unloading a workpiece into and out of a grinding machine utilizing the described type of conventional driving dog system is usually a tedious and time consuming task which tends to adversely offset grinding production rates. A machine operator must manually position the driving dog over each workpiece and then carefully tighten it making sure that alignment is proper and that the set screw is not causing deflection of the sometimes extremely fragile workpieces. After the grinding operation is complete, the driving dog must again be manually and carefully detached from the workpiece and stored separate from the machine in connection with which it is used.

Utilization of a conventional driving dog in order to chuck a workpiece in connection with which precision grinding operations are to be performed thereon presents yet another problem. That is, the necessarily non-symmetrical configuration of a common driving dog, upon rotation, tends to create radial positioning forces which generally push or pull the workpiece off the centers upon which it is mounted. The effect of these forces upon the rotation of the workpiece makes grinding within close tolerances very difficult, if not impossible.

In addition, the non-uniform method by which the driving dog clamps down upon a workpiece will sometimes cause a workpiece to temporarily slip within the driving dog when the workpiece is first rotated, causing the surface of the workpiece to become scratched or marked.

OBJECTIVES OF THE INVENTION

It is a general objective of this invention to provide a work driver for use upon grinding machines, lathes, or similar equipment within which workpieces are located between centers and rotated thereby, which increases production rates by permitting rapid workpiece loading and unloading procedures to be achieved and which eliminates tedious and time consuming manual labor.

It is another general objective of this invention to provide a work driver which when properly attached to a workpiece is in effect, free-floating and therefore does not produce radial positioning forces which tend to bias the workpiece out of alignment or off-center during thereof.

It is a related objective of the present invention to provide a work driver for use with extremely fragile workpieces requiring precision grinding or operations, within close tolerances, to be performed thereon.

A further objective is to provide a work driver which cannot be easily misplaced or subjected to damage while not in use.

Still another objective is to provide a work driver for between-center grinding or machining of a workpiece which uniformly and securely clamps the workpiece therewithin thereby eliminating the possibility of scratching or marking the surface of the workpiece during rotation thereof.

SUMMARY OF THE INVENTION

Briefly stated, the unique work driver disclosed herein comprises a collet package, an actuating means and a housing acting together as a unique interface between a machine spindle and a workpiece.

After loading a workpiece into the collet package portion of the work driver, the machine spindle is rotated, thereby rotating both the work driver and the workpiece and enabling the needed treatment or machining operation to be accomplished. During rotation, the collet package holding the workpiece floats substantially free from contact with or influence by means of the remaining components of the work driver with respect to the workpiece. As a result, the work driver automatically compensates for existing part eccentricity and does not produce forces adversely affecting a balanced rotation of the workpiece.

Energizing the actuating means of the work driver allows a finished workpiece to be quickly removed and replaced with another workpiece thereby increasing production rates and eliminating tedious and time consuming manual labor. The unique construction of the work driver also serves to insure proper initial positioning of the workpiece as well as preventing slippage of the workpiece with respect to the work driver once loaded therein.

Between workpieces, or during periods when the work driver and associated machinery are not being used, the collet package is loosely retained within a housing portion of the work driver. Thus, the chances of the collet package being misplaced or damaged are eliminated.

The work driver can be utilized to perform precision grinding operations, even upon extremely fragile workpieces, and within very close tolerances.

BRIEF DESCRIPTION OF THE DRAWINGS

Other objects and advantages will become apparent from the attached detailed description of the invention and upon reference to the drawings, in which like reference characters designate like or corresponding parts throughout the several views, and wherein.

DETAILED DESCRIPTION OF THE INVENTION

Figure 1:
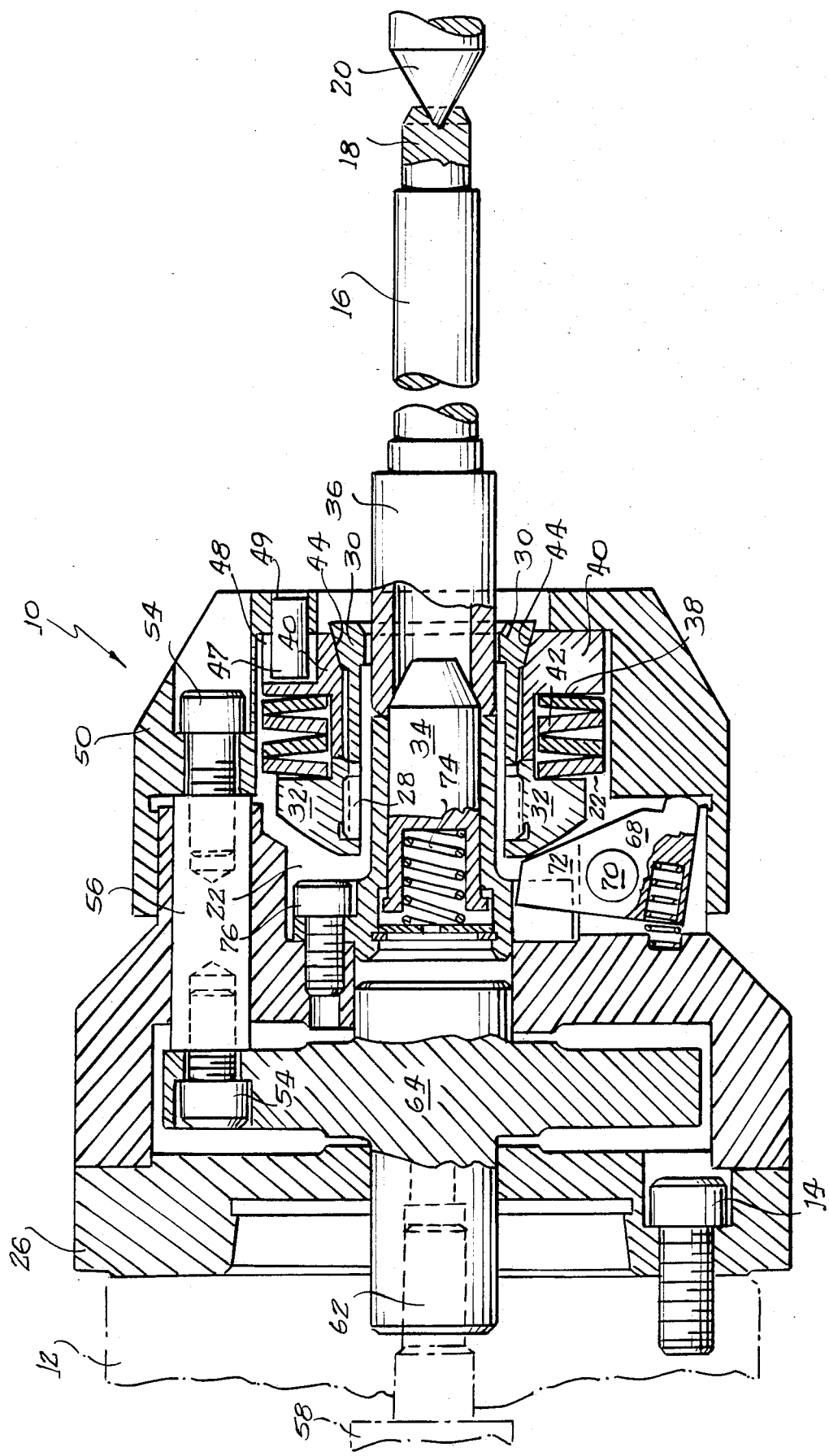
FIG. 1 is an elevational sectional view of the work driver with the collet package portion thereof held in an "open" position.
Figure 2:
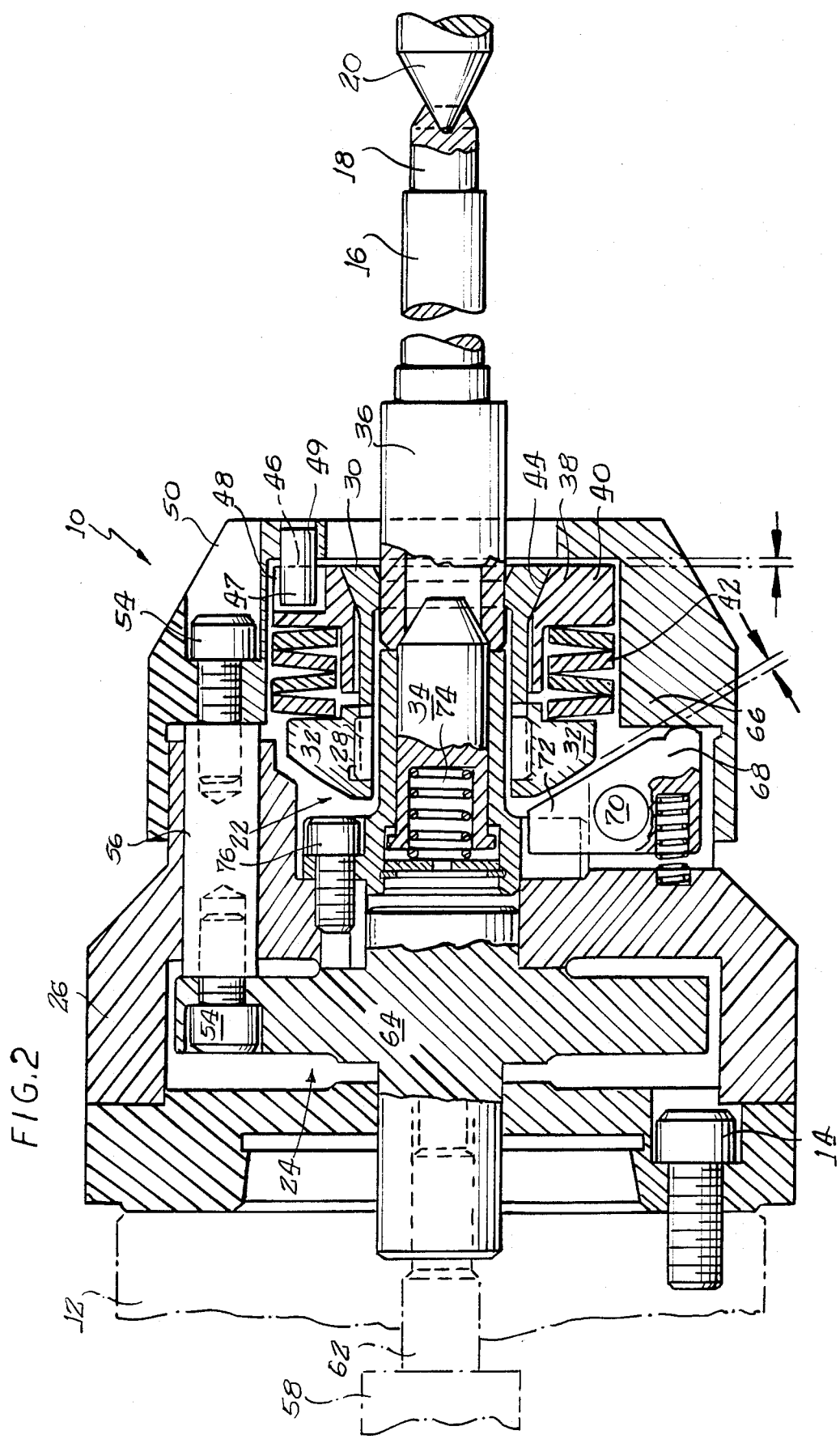
FIG. 2 is an elevational sectional view similar to that of FIG. 1 wherein the collet package portion of the device is disposed in a "closed" position.

In accordance with the present invention, FIGS. 1 and 2 show a work driver 10 fastened to a conventional machine spindle 12 utilizing bolts 14 (one of three shown). A representative workpiece 16 is also shown in FIGS. 1 and 2 supported at a back end 18 thereof by means of a tailstock 20. The distinction between FIGS. 1 and 2 resides in that FIG. 1 illustrates the work driver 10 in an "open" position while FIG. 2 shows the work driver 10 in a "closed" position. In the "open" position, a workpiece 16 can be rapidly inserted into or removed from the work driver 10. Conversely, in the "closed" position the workpiece 16 is clamped within the work driver 10 which functions to transfer rotational motion from the machine spindle 12 to the workpiece 16.

Turning now to the details of the present invention, the work driver 10 comprises a collet package 22, an actuating means 24, and a main body portion 26. The collet package 22 includes a collar member 28 having fingers 30 which extend axially from a finger base 32 so as to surround and uniformly grip the workpiece 16 mounted upon a work center 34 when the work driver 10 is in the "closed" position. Gripping pressure is provided so as to force the fingers 30 into firm engagement with a forward end 36 of the workpiece 16 by means of a spring unit 38, which, in combination with the fingers 30 and finger base 32 comprises the entire collet package 22. The spring unit 38 includes a spring base 40 and disc spring 42 normally held in compression so as to normally force apart the finger base 32 with respect to spring base 40 in the axial direction.

The axial separation of these two components forces the fingers 30 to slide backwardly (toward the left as seen in FIGS. 1 and 2) along an inclined surface 44 of the spring base 40 and thereby radially collapse the collar member 28 onto the forward end 36 of the workpiece. The collet package 22 is not radially supported by means of the work center 34 and the clamping force provided by means of the collar member 28 is circumferentially uniform and therefore does not influence the position o the workpiece 16 located upon the work center 34. This is particularly important when small cross-sectioned workpieces of fragile and/or brittle materials are being held by means of the work driver 10 since even minor deflection forces can cause serious fracture of these types of workpieces.

In most applications, the fingers 30, at their point of contact with the workpiece 16 can be smooth-surfaced and still provide superior clamping pressure. If desired however, a serrated surface can be provided so as to increase the frictional retention force upon the workpiece 16. A serrated surface might be necessary in the event that driving forces of higher magnitudes are delivered from the machine spindle 12 in order to accommodate specialized grinding or machining requirements.

As discussed above, FIG. 2 illustrates the work driver 10 in the "closed" position so as to hold and drive a workpiece 16. Upon closer inspection of FIG. 2 it will be noted that in this "closed" position, the collet package 22 is totally free from contact with any other work driver components, except for a drive pin 46. For this reason, upon rotation, the unique work driver 10 automatically compensates for existing part eccentricity and does not produce forces tending to influence the workpiece position or otherwise act to create unbalanced rotation thereof. Consequently, precision grinding specifications within close tolerances can be attained.

Figure 3:
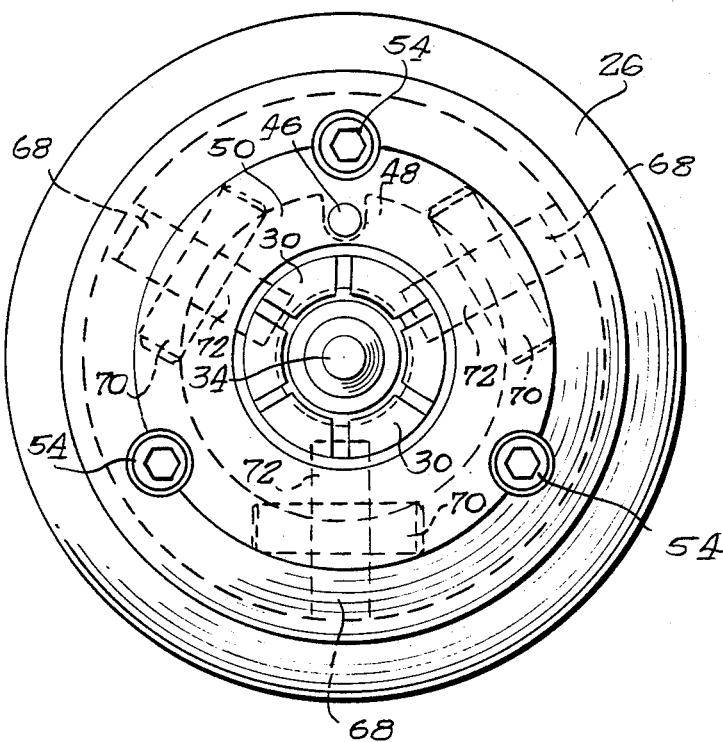
FIG. 3 is a front view of the work driver device.

In the embodiment shown in FIGS. 1 through 3, the collet package 22 is driven by means of a single drive pin 46, one end 47 of which fits loosely within a slot 48 defined within the spring base 40. The other end 49 of the drive pin 46 is fixed within a front cap 50 which is mounted for rotation in unison with the main body portion 26 of the automatic work driver 10 by means of bolts 54 and posts 56 (one of three shown).

In order to remove and replace a workpiece 16 from the collet package 22, a preferably remote piston and cylinder device 58 mounted upon the machine spindle 12 is used to apply "pull" pressure to the actuating means 24 which in turn releases the collet package 22 from the workpiece 16. If desired, the piston and cylinder 58, which can be a conventional double-acting air or hydraulic device, could easily be incorporated into the automatic work driver 10 itself. In operation, a draw bar 62 which is coupled to the piston and cylinder device 58, is drawn rearwardly (toward the left as seen in FIGS. 1 and 2) upon activation of the piston and cylinder 58. The rearward axial motion of the draw bar 62 pulls an actuator plate 64 disposed radially inwardly of the main body 26, backwardly, which in turn draws front cap 50 and drive pin 46 rearwardly by means of bolts 54 and posts 56. This causes the drive pin 46 and front cap 50 to come into contact with spring base 40. Simultaneously, an inner surface 66 of the front cap 50 applies rearwardly directed axial pressure upon levers 68 (one of three shown) thereby causing the levers 68 to pivot about fulcrums 70 thereby forcing front edges 72 of the levers 68 against finger base 32 thereby driving it forwardly in the axial direction.

The combination of the rearwardly directed axial force upon spring base 40 and the forwardly directed axial force exerted upon finger base 32 tends to further compress disc spring 42 thereby causing fingers 30 to slide forwardly along spring base surface 44. Preferably, the collar member 28 is manufactured of a resilient, material predisposed to radially expand when the inwardly directed radial pressure impressed thereon by means of spring base surface 44 is released thereby causing the fingers 30 to expand radially outwardly thereby allowing the workpiece 16 to be quickly and easily removed and replaced.

In order to reload the work driver 10 with another workpiece, a new workpieoe is easily inserted into the loosely supported collet package 22 and into engagement with the work center 34. The cylinder and piston device 58 is then actuated in reverse so as to push the draw bar 62 axially forward thereby causing the actuator plate 64, bolts 54, posts 56, front cap 50 and drive pin 46 to move an equivalent forward distance. Levers 68 are returned to their position corresponding to the "closed" position of the collet package by a resilient spring-biasing means 60 and fingers 30 are again forced to radially collapse and grip the workpiece 16. Consequently, the collet package 22 is again totally free from contact with all of the other components of the work driver 10. Thus, the workpiece 16 will rotate free from rotational forces tending to deflect it or push or pull it out of axial alignment with respect to work center 34 and tailstock 20.

From the foregoing it will be appreciated that without a workpiece 16 positioned therein, the collet package 22 is loosely retained by the work driver 10 and will not become separated therefrom. The quick and simple method of insertion and replacement of workpieces enables the work driver 10 to improve grinding or machining production rates and eliminate tedious manual labor.

In the preferred embodiment of the invention, the work center 34 is spring-loaded by way of spring means 74 disposed axially behind work center 34 which is bolted to main body portion 26 by means of fasteners 76. Spring-loading the work center 34 functions to positively locate the workpiece 16 both radially as well as axially thereby facilitating the performance of precise grinding or machining operations upon the workpiece 16.

Figure 5:
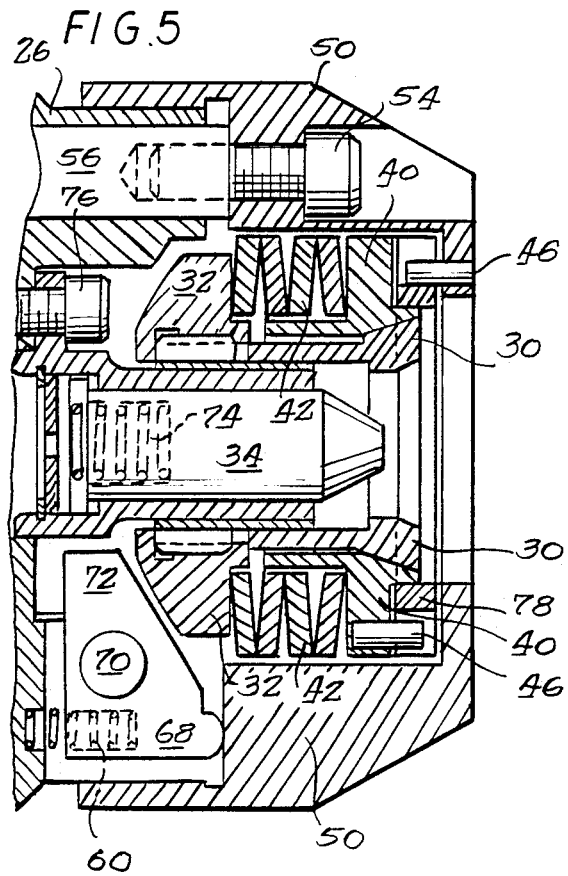
FIG. 5 is a partial sectional elevational view of the work driver incorporating the free-floating drive ring shown in FIG. 4.
Figure 4:
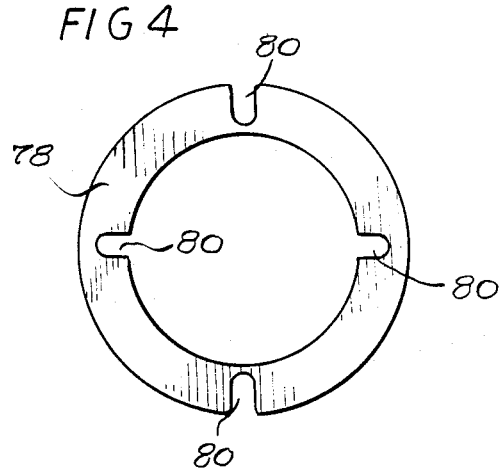
FIG. 4 is an elevational view of a free-floating drive ring which is used in an alternative embodiment of the work driver.

In an alternative embodiment of the invention shown in FIGS. 4 and 5, a free-floating drive ring 78, and preferably three additional drive pins 46 are utilized to balance the driving force provided by means of the machine spindle 12 and thereby further reduce the possibility of the work driver 10 creating radial positioning forces that could adversely affect the balanced rotation of the workpiece 16. The drive ring 78, shown apart from the work driver 10 in FIG. 4, has a circular cross-section with notches 80 defined within peripheral portions thereof so as therein to loosely fit over the drive pins 46 when installed in the work driver 10 as shown within FIG. 5. In illustrated form, two of the four identical drive pins 46 are disposed within the front cap 50 and two are fixedly disposed within the finger base 32 such that like pairs are diametrically opposed with respect to each other.

While the invention has been described in connection with a preferred embodiment, it will be understood that it is not intended to limit the invention to that embodiment. On the contrary, it is intended to cover all alternatives, modifications and equivalents as may be included within the spirit and scope of the invention.

The invention is claimed as follows:

1. A chuck for holding a workpiece, comprising:
   a housing;
   radially expansible/collapsible collet means disposed within said housing for respectively releasing/holding an end portion of said workpiece;
   means, having a first surface facing into said housing and toward a housing side of said chuck and a second, opposite surface facing outwardly from said housing and toward a workpiece side of said chuck, movably mounted within said housing for permitting said collet means to move radially outwardly so as to release said workpiece and for causing said collet means to move radially inwardly so as to hold said workpiece;
   first actuating means disposed within said housing and acting upon said first surface of said movably mounted means for moving said movably mounted means in a first direction as a result of which movably mounted means causes said collet means to move radially inwardly so as to hold said workpiece; and
   second actuating means disposed within said housing and extending from said housing side of said chuck to said workpiece side of said chuck and acting upon said second opposite surface of said movably mounted means for moving said movably mounted means in a second direction opposite to said first direction as a result of which said movably mounted means releases said collet means so as to permit said collet means to move radially outwardly to its workpiece release position.

2. A chuck as recited in claim 1, wherein:
   said collet means comprises collar means having radially extending fingers for uniformly collapsing onto and securely gripping said workpiece, and said first actuating means comprises resilient means for normally maintaining said collet means in said work-holding position.

3. The chuck as recited in claim 1, wherein:
   said second actuating means is coupled with a remote piston and cylinder and comprises a rigid link arrangement having a predetermined range of motion in the axial direction for selectively collapsing and expanding said collet means into said releasing and holding positions upon activation of said piston and cylinder.

4. A chuck as set forth in claim 3, wherein:
   said piston and cylinder are components of an air-actuated piston-cylinder assembly.

5. A chuck as set forth in claim 3, wherein:
   said piston and cylinder are components of a hydraulic-actuated piston-cylinder assembly.

6. The chuck as recited in claim 1, wherein said second actuating means further comprise an enclosure rotationally coupled with a machine spindle and having two or more drive pins for rotating said collet means.

7. A chuck as set forth in claim 6, wherein:
   said first actuating means comprises a plurality of disc springs interposed between said collet means and said movably mounted means;
   said second actuating means includes an annular cap annularly surrounding said workpiece having said end portion disposed within said collet means;
   an annular ring member is interposed between said annular cap and said movably mounted means; and
   said drive pins interconnect said annular cap and said annular ring member, and said annular ring member and said movably mounted means.

8. The chuck as set forth in claim 1, wherein:
   said collet means comprises finger-like projections defining a truncated cone and said first and second actuating means includes means for selectively expanding and contracting said cone relative to said workpiece located therein.

9. The chuck as recited in claim 1, wherein:
   said second actuating means comprises an enclosure for partially surrounding said collet means such that said collet means is loosely retained by said enclosure when a workpiece is not being held thereby.

10. The chuck as set forth in claim 1, wherein:
    said second actuating means for moving said collet means between said work-releasing mode and said work-holding mode comprises link means operatively coupled to means for selectively applying pull pressure to said collet means.

11. The chuck as recited in claim 1, wherein:
    said second actuating means further comprises an enclosure rotationally coupled with a machine spindle and having a drive pin for rotating said collet means when held in said work-holding position without imparting radial positioning forces upon said workpiece during rotation.

12. A chuck as set forth in claim 11, wherein:

said first actuating means comprises a plurality of disc springs interposed between said collet means and said movably mounted means; and said drive pin interconnects said second actuating means and said movably mounted means.

13. A chuck as set forth in claim 12, wherein:

said second actuating means includes an annular cap annularly surrounding said workpiece having said end portion disposed within said collet means.

14. A chuck as set forth in claim 1, wherein:

said collet means is of the free-floating type.

15. A chuck as set forth in claim 1, wherein:

said collet means is of the radially-free type.

16. A chuck as set forth in claim 15, further comprising:

means for rotating said collet means while in said workpiece-holding mode so as to thereby effectuate balanced rotation of said workpiece.

17. The chuck of claim 16 wherein said second actuating means for moving said collet means between said work-releasing and work-holding positions are rotatively coupled to said means for rotating and said means for moving said collet means between said work-releasing and work-holding positions is moveable in the axial direction with respect to said means for rotating.

18. The chuck of claim 16, wherein said means for rotating said collet means includes a cylindrical casing for retaining said radially free collet means within said chuck during insertion and removal of a workpiece and when not in use.

19. A chuck as set forth in claim 1, wherein:

said first actuating means comprises a plurality of disc springs.

20. A chuck as set forth in claim 19, further comprising:

said disc springs are interposed between said collet means and said movably mounted means; and pivotable lever means having one end portion thereof engageable with said second actuating means and a second end portion thereof engageable with said collet means such that when said second actuating means is moved in a first axial direction so as to compress said disc springs and permit said collet means to move to said work-releasing position, said lever means causes movement of said collet means in a second axial direction opposite to said first axial direction whereby said disc springs are compressed further.

* * * * *